United States Patent [19]

Ho

[11] Patent Number: 4,971,091

[45] Date of Patent: Nov. 20, 1990

[54] DISPENSER FOR IRRIGATION CHEMICALS WITH FAIL-SAFE ANTISIPHON VALVE

[76] Inventor: I-Chung Ho, 6958 Grovespring Dr., Rancho Palos Verdes, Calif. 90274

[21] Appl. No.: 421,518

[22] Filed: Oct. 13, 1989

Related U.S. Application Data

[63] Continuation-in-part of Ser. No. 313,616, Feb. 21, 1989, Pat. No. 4,907,618, which is a continuation-in-part of Ser. No. 215,741, Jul. 6, 1988, Pat. No. 4,881,568.

[51] Int. Cl.$^5$ .............................................. A01C 23/00
[52] U.S. Cl. ..................................... 137/14; 137/268; 137/218; 422/282; 222/310
[58] Field of Search .................. 137/268, 205.5, 218, 137/102, 1, 14; 422/282, 281; 239/201, 272, 309, 310, 317, 570

[56] References Cited

U.S. PATENT DOCUMENTS

| | | | |
|---|---|---|---|
| 2,282,188 | 5/1942 | Horne | 137/218 |
| 2,960,996 | 11/1960 | Haselton | 137/218 X |
| 3,180,352 | 4/1965 | Kersten | 137/218 |
| 3,424,188 | 1/1969 | Whitaker | 137/218 |
| 4,846,403 | 7/1989 | Mivelaz | 137/218 X |

Primary Examiner—Alan Cohan

[57] ABSTRACT

A dispenser for irrigation chemicals includes an antisiphon or vacuum breaker valve which includes redundant valve members disposed at differing levels to on the one hand ensure communication of ambient pressure to the valve outlet, and on the other hand ensuring that no subambient pressure at the valve inlet is communicated to the outlet of the valve. The differing levels of the two redundant valves ensures also that backflow water from the outlet is vented to ambient without reaching a level sufficient to allow flow into the inlet flow path of the valve. The dispenser includes means to sealingly receive a chambered cartridge of irrigation chemical having a frangible diaphragm capturing the chemical therewithin, and means for penetrating the diaphragm in response to a low of irrigating water to dispense the chemical material along with the irrigating water flow.

19 Claims, 3 Drawing Sheets

DISPENSER FOR IRRIGATION CHEMICALS WITH FAIL-SAFE ANTISIPHON VALVE

CROSS REFERENCE TO RELATED APPLICATION

The present application is a continuation-in-part of my previous application Ser. No. 07/313,616, entitled "Dispenser for Irrigation Chemicals", filed Feb. 21, 1989, now U.S. Pat. No. 4,907,618; which was a Continuation-in-Part of my application Ser. No. 07/215,741, entitled, "Irrigation Chemical Dispenser", filed July 6, 1988, now U.S. Pat. No. 4,881,568.

BACKGROUND OF THE INVENTION

The present invention relates to a dispenser for irrigation chemicals. More particularly, the present invention relates to a dispenser for providing water soluble or water-borne chemicals via an irrigation system to the vegetation served thereby.

More particularly, the present invention relates to such a dispenser for irrigation chemicals including a fail-safe antisiphon, or vacuum breaker, valve.

A conventional dispenser for irrigation chemicals is known wherein a cup-like canister is provided which communicates with a water supply pipe of an irrigation system. A single compressed pellet of chemical material is placed into the cup-like canister. When the irrigation system operates, the water flow through the pipe is in part diverted through the canister and carries the chemical material to the vegetation by dissolving or eroding the pellet of chemical material.

While this known conventional irrigation chemical dispenser is inexpensive and simple in construction and use, it also suffers from several deficiencies. For example, because the pellet of chemical material to be inserted into the cup-like canister is available in one size only, the quantity of chemical material dispensed cannot be proportioned according to the area of vegetation or number of plants served by the irrigation system. Possibly, a user of such a dispenser may attain a rough approximation of such proportioning by breaking the pellets into fractions for an irrigation system serving a small vegetation area, or providing multiple dispensers in a system serving a large vegetation area. However, both of these expedients are undesirable, and are inconvenient or expensive.

This known canister-type chemical dispenser is limited in its use to chemicals of solid form which can be compressed into the single pellet for inserting into the canister. While a variety of such pellets are available for grasses, evergreens, roses, etc., the conventional canister-type dispenser cannot use irrigation chemicals of liquid, paste, powder, or granular form.

Another conventional irrigation chemical dispenser is known in accord with U.S. Pat. No. 4,558,715. This teaching is believed to provide a dispenser wherein a drive piston is reciprocated by flowing water under control of a valve device. The drive piston, by its reciprocation, causes reciprocation also of a metering piston. The metering piston draws a selected liquid irrigation chemical from a source thereof and injects the liquid chemical into the water flow downstream of the drive piston.

Unfortunately, the device taught by the '715 patent is both somewhat complex in its construction, and expensive. This device controls the flow of liquid irrigation chemical as a percentage of the total water flow. Such precise control of the percentage of irrigation chemical is believed not to be necessary for an irrigation system to successfully meet the needs of the vegetation served thereby. All that need be effected, in contrast, is control of the total quantity of chemical material dispensed according to the vegetation area or number of plants served by the irrigation system. The device according to the '715 patent is further limited to use of liquid irrigation chemicals.

With all of the conventional irrigation chemical dispensers mentioned above, if a potable water system feeds the irrigation system, the latter must generally include a conventional antisiphon valve as well. Such antisiphon valves are employed to ensure no water from the irrigation system may be drawn back into the potable water supply. Such drawing back of irrigation system water into the potable water supply may occur if a partial vacuum exists in the latter.

A partial vacuum in the potable water supply piping to the irrigation system may result, for example, from maintenance work of the water main feeding the area. When the water main is shut off and opened for maintenance at a level below the branch piping, water in the branch piping runs toward the opening. This flow of water in the branch piping toward the lower opening of the main pipe results in a partial vacuum being created in various parts of the branch piping. Because a branch pipe feeds the irrigation system, the partial vacuum could draw water from the irrigation sysstem into the potable water supply. This back flow water may be laden with bacteria or chemicals from the irrigation system, and may present a health hazard. An antisiphon (or vacuum breaker) valve is used between the irrigation system and the potable water supply to prevent such back flow of water to the potable supply.

While vacuum breaker valves are availble in a variety of designs, a popular type is the pipe applied atmospheric vacuum breaker. This type of vacuum breaker valve includes a housing defining an inlet, an outlet, and a flow path communicating a flow of water between the inlet and outlet. The flow path includes a chamber from which a vent passage opens to ambient. A valve member is movable in the chamber to close the vent passage when water pressure is applied at the inlet. The valve member must open the vent passage when the inlet pressure is atmospheric. Simply stated, the atmospheric vacuum breaker consists of a check valve controlling an air vent that is closed when the device is pressurized and open when the inlet pressure is atmospheric.

In assessing the operating effectiveness of atmospheric vacuum breaker valves, the free water level of the irrigation system is used as a reference level (See, A.S.S.E. Standard No. 1001, Revised: Aug. 1988). This free water level is the highest standing water level which will remain in the irrigation system when pressurized water flow is not being provided. In other words, the irrigation system is considered as a basin having an overflow rim. The height of this rim is the level of water which will remain in the irrigation system. Usually, this free water level for an irrigation system is the grade level of the irrigation water discharge heads. On the other hand, the overflow level of the potable water conduit at the atmospheric vent within the vacuum breaker valve is considered the critical installation level (CIL) for the valve. The vacuum breaker valve must be installed with its CIL a certain distance above the free water level of the irrigation system. In order to assess the effectiveness of the vacuum breaker valve, an intentional fault is introduced into the valve to communicate to the outlet a vacuum applied to the inlet of the valve. The vacuum might undesirably draw water up the outlet toward the inlet. The atmospheric venting effected by the valve must be sufficient to prevent water being drawn into the outlet above a set level. Usually, the height of the CIL above the free water level is six inches, and the highest allowed draw back height is three inches. Thus, the conventional vacuum breaker valve is required to provide a safety factor of two with respect to effective vacuum venting and water draw back at the outlet of the valve.

Unfortunately, when a conventional vacuum breaker valve is employed in combination with a conventional irrigation chemical dispenser, the dispenser might be required to be located a considerable distance below the vacuum breaker valve to insure no irrigation chemical is drawn into the valve. This necessary vertical separation with conventional dispensers and vacuum breaker valves undesirably increases the space required for the plumbing installation.

SUMMARY OF THE INVENTION

In view of the deficiencies of the conventional irrigation chemical dispensers pointed out above, it is an object for the present invention to provide a dispenser for irrigation chemicals which is simple and inexpensive in its construction, which presents only a minimal resistance to water flow therethrough, and which is very positive in its action to open an irrigation chemical cartridge provided with a penetrable diaphragm through which the irrigation chemical stored therein is accessible.

Another object for the present invention is to provide a dispenser for irrigation chemicals including a single-use disposable cartridge holding a premeasured quantity of selected irrigation chemical, which cartridge is sealed by a penetrable diaphragm prior to and after its insertion into the dispenser of the present invention.

Still another object for the present invention is to provide an irrigation chemical dispenser allowing simple, convenient, and safe handling of the irrigation chemical by maintaining the chemical in a sealingly closed cartridge until a dispensing flow of water is employed to open the cartridge.

Yet another object for this invention is to provide an irrigation chemical dispenser which includes an integral fail-safe antisiphon feature which will serve to satisfy the local plumbing codes in many areas without the need for a separate antisiphon valve.

Another object for this invention is to provide a dispenser for irrigation chemicals of the above-described character wherein a sealed cartridge of irrigation chemical is joined with the dispenser while remaining sealed, and is automatically and positively opened and dispensed by the dispenser upon the onset of water flow in the irrigation system including the dispenser.

Additional objects and advantages of the present invention will be apparent from a reading of the following detailed description of a particularly preferred embodiment of the invention, taken in conjunction with the appended drawing figures, in which:

BRIEF DESCRIPTION OF THE DRAWING FIGURES

FIGS. 1 and 2 in conjunction provide respective elevation views, each taken generally along the line 1—1 of
FIG. 3, and showing parts of the apparatus in alternative operative positions.

FIG. 3 provides a plan view of the irrigation chemical dispenser seen in FIGS. 1 and 2, partially in cross section taken generally along the line 3—3 of FIG. 1.

DETAILED DESCRIPTION OF THE PREFERRED EMBODIMENT OF THE INVENTION

Figure 1:
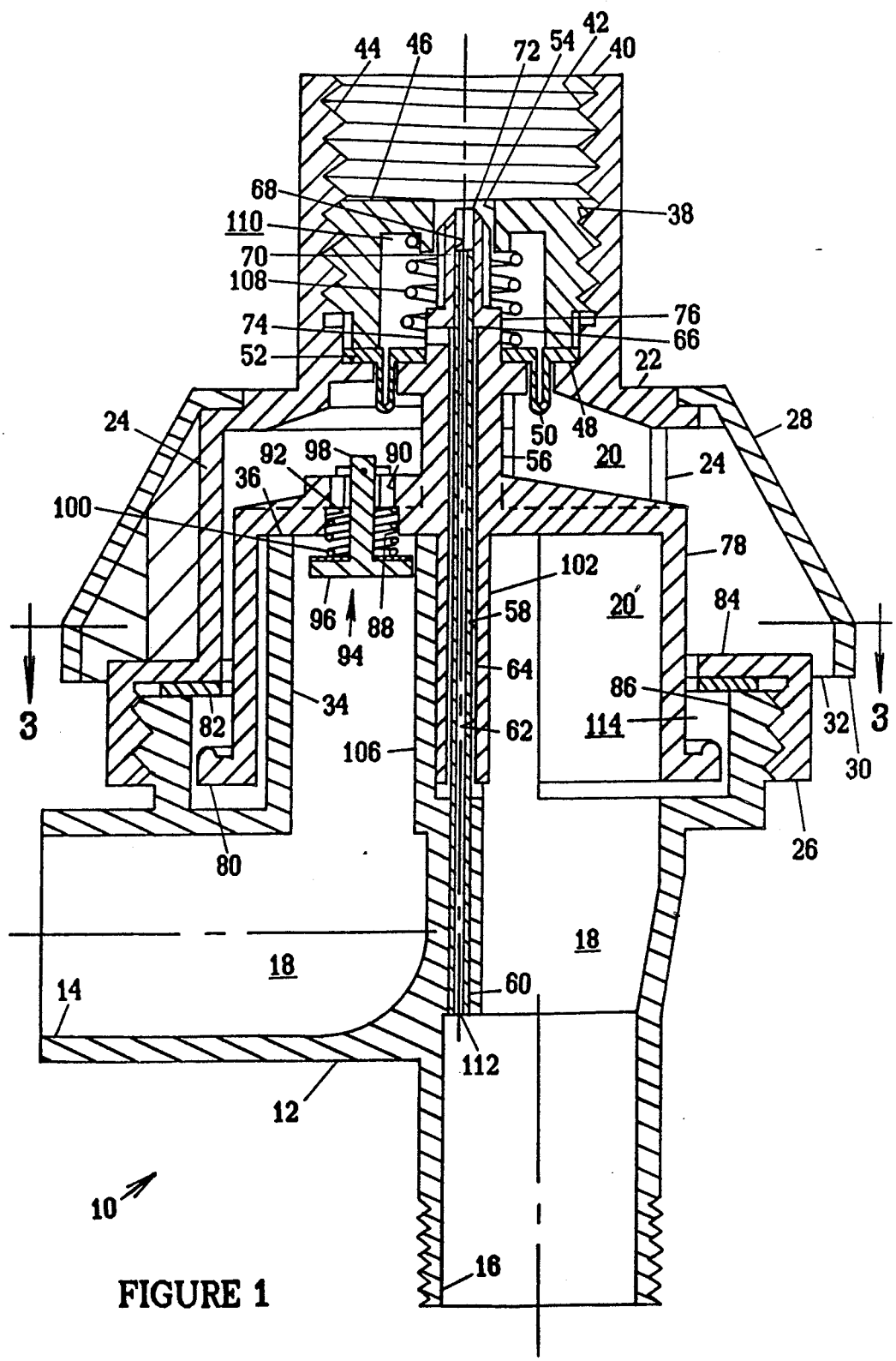
Figure 2:
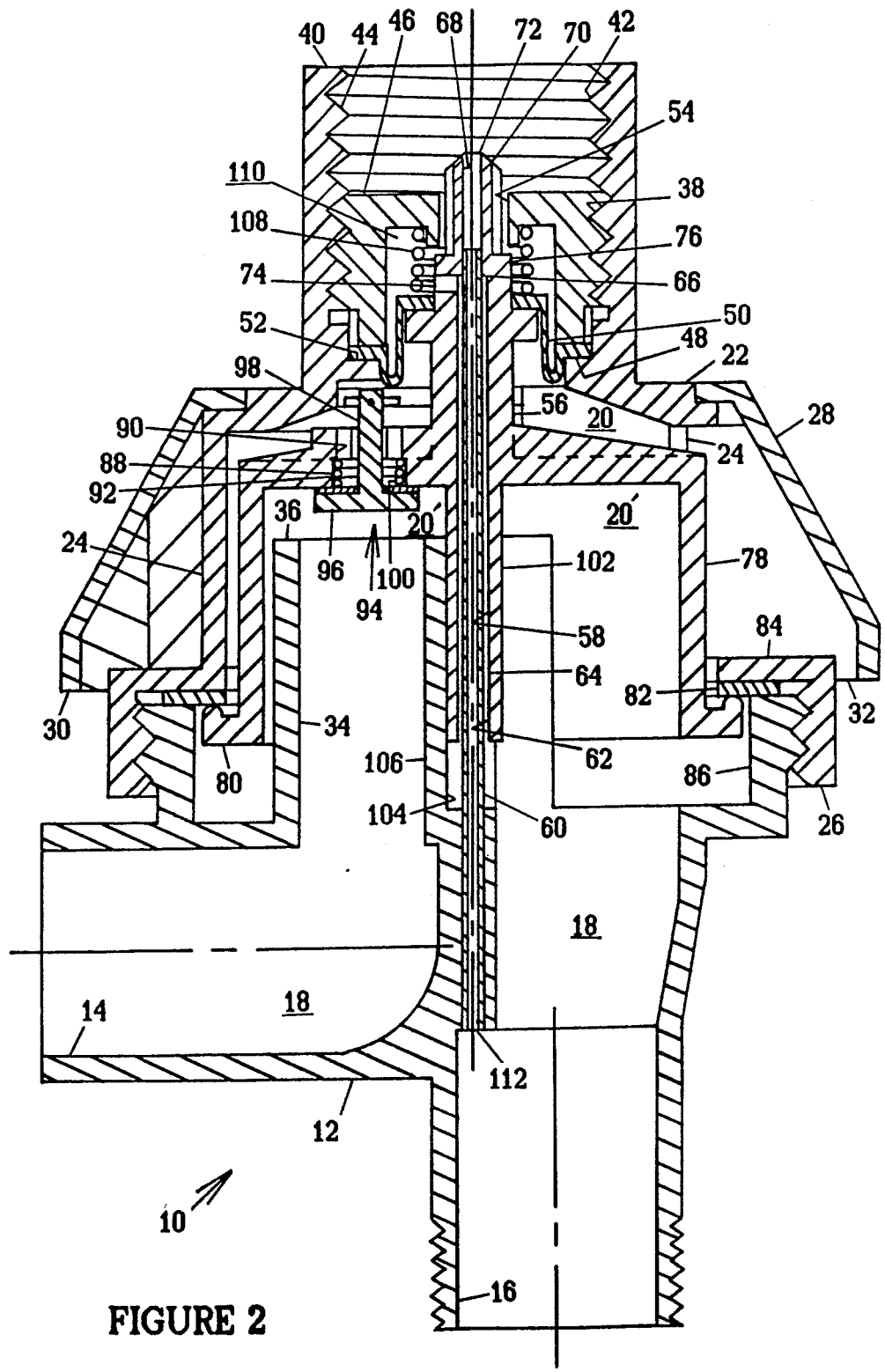
Figure 3:
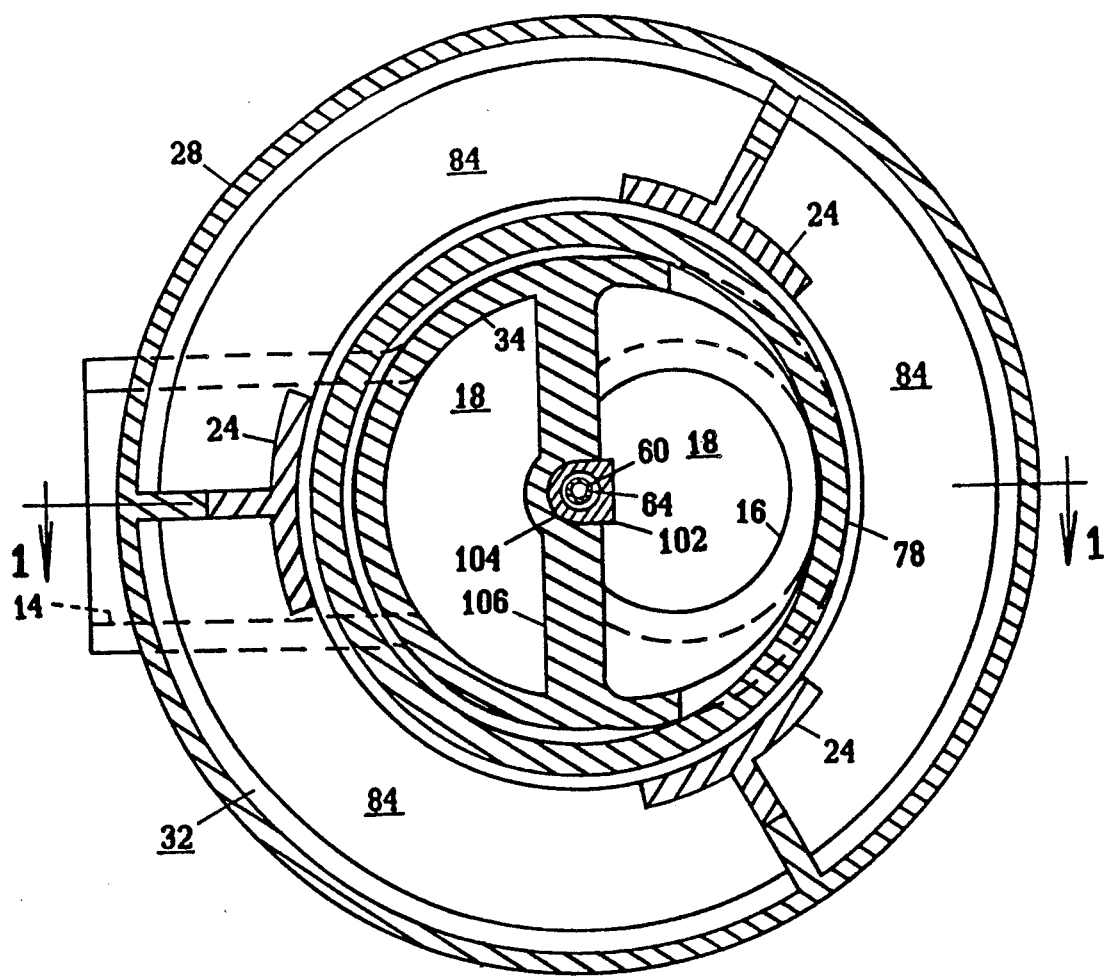

FIGS. 1,2 and 3, respectively depict cross sectional elevation views, and a cross sectional fragmentary plan view of a dispenser 10 for irrigation chemicals according to a preferred embodiment of the invention. The dispenser 10 includes a housing 12 defining an inlet port, generally referenced with the numeral 14, and an outlet port generally referenced with the numeral 16. The housing 12 also defines a flow path 18 communicating between inlet port 14 and outlet port 16, The housing 12 defines an upwardly extending generally annular chamber 20 defining a part of the flow path 18. A cap member, generally referenced with the numeral 22, cooperates with the remainder of the housing 12 to upwardly bound the chamber 20. Viewing FIG. 3, it will be seen that the cap member 22 includes three vertically extending rib portions 24, only one of which is fully visible in FIGS. 1 and 2. The rib portions 24 connect an annular securing and gasket carrying ring portion 26 to the remainder of the cap member 22. The ribs 24 and ring portion 26 cooperatively support an annular skirt member 28, which at its lower marginal edge 30 is spaced radially outwardly of the ring portion 26 of the housing 12. The housing 12 and skirt 28 cooperatively define an annular air vent gap 32 which communicates the chamber 20 to ambient. Within the chamber 20, the housing 12 defines an upwardly extending inflow conduit extension 34. This extension 34 defines therewithin part of the flow path 18 leading from inlet 14 to chamber 20, and defines an upper edge surface 36.

The dispenser housing 12 also defines an outwardly extending stepped bore, generally referenced with the numeral 38, extending from the chamber 20 to open outwardly on the housing 12 at 40. An outer portion 42 of the bore 38 defines a thread 44. An annular member 46 is threadably received in the bore 38 and sealingly traps an outer marginal portion 48 of a flexible rolling-diaphragm type of sealing member 50 against a step 52 on the bore 38. The annular member 46 also defines an axially extending stepped through guide bore 54, which is coaxial with the bore 38.

A multifunction plunger member 56 is movably received in the chamber 20 and in stepped bore 38. Particularly, the plunger member 56 defines a stepped through bore generally referenced with the numeral 58, and having two bore portions of differing and successively smaller diameters from bottom to top, as seen viewing the Figures. The plunger member 56 is slidably received upon a corrosion-resistant guide tube 60, in the chamber 20, bore 38, and guide bore 54. Referring once again to the stepped through bore 58, the latter includes a lower larger diameter or metering portion 62 cooperating with the corrosion-resistant guide tube to define therewith an axially extending radial metering clearance 64. Above the bore portion 62, the stepped bore 58 includes a comparatively smaller diameter or flow restricting portion 66. The tube 60 is slidably received in the smaller bore portion 66 to define therewith a radial clearance (not depicted on the drawing Figures) sufficient large to allow relative reciprocating movement of the plumger member 56 on tube 60, but sufficiently small also as to substantially inhibit or restrict axial flow of water therethrough. Finally, above the bore portion 66 the stepped bore 58 includes a bore portion 68 opening upwardly through the plunger member 56 above the upper end of the guide tube 60. The bore portion 68 may be substantially the same diameter as the bore portion 66.

The plunger member 56 includes an elongate axially extending penetrator portion 70 terminating in a sharp point 72 confronting the outer bore portion 42 of stepped bore 38. The bore portion 68 opens at the point 72 of penetrator portion 70. Also, the penetrator portion 70 defines a laterally extending passage 74 communicating outwardly from bore portion 62 immediately below bore portion 66 to open on a lateral surface 76 of the penetrator portion 70.

A cartridge of irrigation chemical material (not shown) is threadably receivable into the bore portion 42 to confront a frangible diaphram thereof with the point 72 of the penetrator portion 70. The immediately foregoing cartridge penetrating structure is functionally identical with that disclosed in my earlier continuation-in-part patent application Ser. No. 07/313,616, the disclosure of which is incorporated herein by reference to the extent necessary for a complete understanding of the present invention.

The plunger member 56 also includes an inverted cup-like first valve portion 78 which is vertically reciprocably received in the chamber 20, and which receives therewithin the vertical extension portion 34. The cup-like portion 78 separates a sub-chamber 20' therewithin from the remainder of the chamber 20. This cup-like portion in a first position depicted in FIG. 1, rests upon the upper edge surface 36 of the extension 34. A radially outwardly extending annular lip 80 of the cup-like portion 78 is disposed in confronting relationship with an annular sealing member 82, which is captured between a flange part 84 of the ring portion 26 and an upwardly extending annular rib portion 86 of housing 12. The ring portion 26 and rib portion 86 threadably engage one another to retain these parts of the housing 12 in engagement with one another.

The portion 78 of plunger member 56 defines a stepped through bore 88 aligning with the inflow path 18 within extension 34. A passage 90 extends from a lower larger diameter part 92 of the bore 88 upwardly to open to the chamber 20 above the cup-like portion 78. A gravity-responsive second valve member 94 is movably carried by the cup-like portion 78 at the bore 88 in alignment with the inflow path 18 at extension 34. The valve member 94 includes a disk portion 96, and a stem 98 which is freely movable in the bore 88. A spring 100 having a light spring rate extends between the disk portion and the cup-like portion while encompassing the stem 98 within the larger diameter bore portion 92 to urge the valve member 94 to an open position. The spring 100 is optional because the valve 94 is loosely carried in the bore 88, and is fabricated preferably of a comparatively weighty material, to move to the open position by its own weight. As will be more fully appreciated after consideration of the functioning of the dispenser 10, the assured opening of the valve 94 provides a fail-safe feature in the dispenser with respect to vacuum breaking.

In order to non-rotatably dispose the plunger member 56 in the chamber 20, and to ensure alignment of the valve 94 with the inflow path of the extension 34, the plunger member includes a central non-circular depending portion 102. The depending portion 102 is received into a non-circular vertically extending groove 104, viewing FIG. 3. The groove 104 is defined by a partition portion 106, which bounds the inflow path 18 on its opposite side, and defines a part of the extension 34.

Having observed the structure of the dispenser 10, attention may now be directed to its method of operation. Viewing the drawing Figures again, it will be seen that when a flow of water is admitted to the housing 12 via the inlet port 14, this water flow will be directed by the flow path 18 within extension 34 generally upwardly at the underside of the cup-like portion 78 of plunger member 56. In other words, the extension 34 establishes a direction for the flow of water which is parallel with and in the direction of possible movement of the plunger member 56. At the same time, the cup-like portion 78 and the disk portion 96 of valve 94 present a bluff surface or abutment against which the inflow of water is directed. As a result, the inflow of water strikes both the underside of the cup-like portion 78 and valve 94 to urge both of these members upwardly substantially simultaneously. The water also undergoes a deflection or change of direction of about ninety degrees so that a portion of the water's momentum is imparted to the plumger member 56. The result is a strong upwardly directed force effective on the plumger member 56 to move the latter upwardly from its first position as depicted in FIG. 1 toward a second position therefore as shown in FIG. 2 in opposition to the bias of a spring 108. The valve 94 is also moved upwardly relative to the plunger member 56 to its closed position shown in FIG. 2.

Consequently to the above, several events occur simultaneously with upward movement of the plunger member 56. The lip 80 engages sealing member 82 to close communication between the underside of the cup-like member and the remainder of chamber 20. In other words, the flow path 18 does not communicate with ambient in the second position of the plunger member 56. At the same time, the part of chamber 20 below cup-like portion 78 is sealingly separate from ambient and communicates inlet port 14 with outlet port 16 via the inflow passage defined within extension 34.

The penetrator portion 70 of the plunger member 56 is driven upwardly to nonsealingly penetrate the diaphragm of the irrigation chemical cartridge (not shown), which is received in the bore portion 42. Further, recalling the description above, the lateral surface 76 of the penetrator portion 70 is grooved or fluted to insure it does not sealingly engage the diaphragm of the irrigation chemical cartridge upon penetrating the latter. Also, this diaphragm is of such a nature that it does not of its own nature tend to sealingly engage the penetrator portion 70. Preferably, the diaphragm is defined by a comparatively thin and tearable metallic foil, or by a metallic foil laminated with a thin layer of polymer. The small passage 74 communicates the metering clearance 64 with a chamber 110 defined annularly around the penetrator portion 70 within the annular member 46. The point 72 of the penetrator portion 70 is disposed within the irrigation chemical cartridge so that the bore portion 68 opens to a chamber of the cartridge.

With the plunger member 56 in its second position, water flows in a relatively small quantity from flow path 18 axially upwardly in the metering clearance 64 defined between bore portion 62 and the corrosion-resistant guide tube 60. This metered water flow is discharged into the interior chamber of the irrigation chemical cartridge via the lateral passage 74 and chamber 110, flowing between the diaphragm of the irrigation chemical cartridge and the fluted or grooved lateral surface 76 of the penetrator portion 70.

Concurrently, the water flow in flow path 18 passes an outlet 112 of the guide tube 60 to result in an extractor effect. That is, a comparatively low pressure is created at the outlet 112, and is communicated upwardly to the upper portion of the bore 58 via the tube 60 and into the interior chamber of the irrigation chemical cartridge. Because the tube 60 still remains received in the bore portion 66 in the second position of the plunger member 56, only a very small leakage flow of water passes axially from metering clearance 64 through the flow restricting bore portion 66 to be aspirated into tube 60. That is, the upward axial movement of the plunger member 56 between its first position and second position is less than the length of extension of tube 60 into flow restricting bore portion 66. Thus, in the second position of the plunger member 56 the tube 60 somewhat sealingly cooperates with the bore portion 66 to separate a flow path metering water into the irrigation chemical cartridge from a return flow path. The return flow path includes bore portion 68, the part of bore portion 66 above the tube 60, and the interior passage of tube 60 leading to opening 112.

In view of the above, water flows into the irrigation chemical cartridge to mix with or dissolve irrigation chemical therefrom, and is returned to the flow path 18 via the upper portions 68 and 66 of bore 58, along with the tube 60, and outlet 112 thereof. In the manner described immediately above, the dispenser 10 opens a cartridge of irrigation chemical disposed in association therewith, and dispenses the water-soluble or water dispersable contents of the cartridge to the vegetation served by an associated irrigation system.

At the completion of an irrigation cycle, the water flow in flow path 18 ceases. Consequently, the spring 108 returns the plunger member 56 to its first position as depicted in FIG. 1. This spring 108, like the spring 100, is optional because the plunger member 56 may be gravity responsive to return to its first position due to its own weight. Because the cup-like portion 78 once again rests upon the upper edge surface 36 of the extension 34, the flow path 18 upstream of the cup-like portion 78 is substantially sealingly separated from the sub-chamber 20' therewithin. On the other hand, the air gap 32 communicates the chamber 20 and the flow path 18 downstream of the cup-like portion with ambient via an annular flow path 114 defined between the lip 80 and sealing member 82. Additionally, any water remaining in chamber 20' will drain to ambient via the air gap 32, so that the highest possible water level in chambers 20 and 20' is below edge 36. Still additionally, the gravity-responsive valve member 94 returns to its position depicted in FIG. 1 to communicate the flow path upstream of the cup-like portion 78 with ambient.

Thus, in the event a sub-ambient pressure is imposed upon the inlet port 14, water cannot be drawn back to the inlet from the irrigation system. That is, the outlet port 16 is fully and completely communicated with ambient by the comparatively large air gap 32, and the inlet 14 is also completely communicated with ambient via the air gap 32 and passage 90 leading to the lower part of bore 88. This feature of the irrigation dispenser 10 will provide safer antisiphon protection than the plumbing codes of most locales which require a siphon breaker valve for irrigation systems.

Further to the above, comparison of the vacuum breaking operation of the inventive irrigation chemical dispenser 10 will reveal that the present dispenser overcomes the deficiencies of prior vacuum breaker valves. These deficiencies of conventional vacuum breaker valves are conventionally evaluated by introducing a deliberate fault into the valve, which fault communicates the inlet port with ambient to assess how great a vacuum may be communicated to the outlet port of the valve. The present invention provides a separate venting passage for communicating with the outlet port when the inlet pressure is atmospheric, and a second venting passage simultaneously opened by valve 94, which is carried by the primary valve member 56. This second venting passage communicates the inlet port to ambient at a level above the maximum water level at the outlet port. This combination of vertically spaced valves operating in unison completely avoids the limitations of conventional vacuum breaker valves which are assessed by use of the applied vacuum tests. A particularly advantageous feature of the present invention is afforded by the communication of the inlet port to ambient at a level above the level of the air gap. In other words, even should backflow water enter the chamber 20, this water will flow out the air gap while being prevented from entering the inlet port because of the higher level of both the valve 94 and the inflow extension 34. Another particularly advantageous feature of the present invention is provided by the communication of both the outlet 112 and the metering clearance 64 only with the outlet 16. Because of this feature, if any irrigation chemical remains in the cartridge received in bore portion 42 this material can drain only into the flow path 18 leading to outlet 16. No part of any remaining chemical material can drain to the inlet 14.

While the present invention has been depicted and described by reference to a particularly preferred embodiment thereof, no limitation on the invention is implied by such reference, and none is to be inferred. For example, it is apparent that the inventive vacuum breaker valve may be employed without use of my inventive irrigation chemical dispenser. Thus, the invention is intended to be limited only by the spirit and scope of the appended claims, which provide additional definition of the invention.

I claim:

1. A method of breaking a vacuum in a flow path, said method comprising the steps of providing a vent passage from said flow path to ambient, disposing a check valve in said flow path, employing said check valve to in a first position open said vent passage to said flow path downstream of said check valve at a certain height, moving said check valve to a second position in response to a pressurized flow of water in said flow path, employing said check valve in said second position to close communication between said flow path and said vent passage, carrying a second valve member upon said first valve member, moving said second valve member between respective first and second positions in unison with movement of said first valve member, and employing said second valve member in said first position thereof to open communication from said vent passage to said flow path upstream of said first valve member and at a determined height above said certain height while closing said communication in said second position of said second valve member, and further employing said communication with ambient provided by said first valve member to drain from said flow path ambient backflow liquid at said certain height.

2. The method of claim 1 further including the additional steps of forming said housing with an inflow water conduit extension opening at an upper end at said determined height above said certain height, employing said second valve member to communicate ambient with said flow path upstream of said opening of said inflow conduit extension, and utilizing said inflow conduit extension to provide a height difference between said certain height and said determined height which ambient backflow water can not achieve while it is being drained to ambient at said certain height via said first valve member.

3. An irrigation chemical dispenser comprising: a housing defining an inlet, an outlet, and a flow path extending between said inlet and said outlet for communicating a flow of water therebetween, said housing further defining a vent passage opening to ambient from said flow path, a first valve member disposed in said flow path and movable between a first position opening said vent passage to said flow path downstream thereof, in a second position said first valve member closing said vent passage, said first valve member moving from said first to said second position in response to said flow of water in said flow path, a second valve member moving in unison with said first valve member between a respective first position communicating said vent passage with said flow path upstream of said first valve member and a respective second position closing said communication, means for sealingly receiving a chambered cartridge of irrigation chemical material having a frangible diaphragm closing said chamber to capture a supply of irrigation chemical therewithin, and means penetrating said diaphragm to communicate said supply of chemical material to said flow path in response to said flow of water in the latter, wherein said second valve member communicates between said vent passage and said flow path at a height above communication of said vent passage with said flow path via said first valve member.

4. The invention of claim 3 wherein said housing defines an inflow extension conveying said flow path to said first valve member, said inflow extension extending upwardly above said vent passage to terminate at an end edge.

5. The invention of claim 4 wherein said first valve member includes an inverted cup-like portion.

6. The invention of claim 5 wherein said inflow extension extends upwardly within said inverted cup-like portion of said first valve member, said first valve member movably encircling said inflow extension and in said first position thereof resting upon said end edge.

7. The invention of claim 5 wherein said inverted cup-like portion includes a radially extending lip at a lower edge thereof, said lip sealingly engaging said housing in said second position of said first valve member to close communication between said flow path and said vent passage.

8. The invention of claim 7 wherein said housing further includes an annular radially extending sealing member sealingly cooperable with said first valve member, said first valve member in said second position thereof sealingly engaging said sealing member to close communication of said vent passage with said flow path.

9. The invention of claim 8 wherein said radially extending lip of said first cup-like valve member extends radially outwardly at a lower marginal edge of the valve member, said annular radially extending sealing member encircling said first valve member above said radially outwardly extending lip thereof.

10. The invention of claim 5 wherein said cup-like portion of said first valve member includes an end wall, said end wall defining a passage therethrough, and said second valve member being disposed in said passage of said end wall to open and close the latter in said respective first and second positions of said second valve member.

11. An irrigation chemical dispenser comprising: a housing defining an inlet leading to a cavity, an outlet leading from said cavity, and a flow path extending between said inlet and said outlet via said cavity for communicating a flow of water through said housing, said housing further defining a vent passage opening outwardly from said cavity to ambient, a first valve member disposed in said cavity to divide a sub-cavity therewithin from the remainder of said cavity, said valve member moving between a first position opening said vent passage to said flow path downstream of said first valve member and a second position wherein said first valve member closes said vent passage and communicates said inlet with said outlet via said sub-chamber, said first valve member moving from said first to said second position in response to said flow of water in said flow path, a second valve member carried upon said first valve member and moving between a respective first position communicating said vent passage with said flow path upstream of said first valve member and a respective second position closing said communication, said second valve member also moving between its first and second positions in response to said flow of water in said flow path, means for sealingly receiving a chambered cartridge of irrigation chemical material having a frangible diaphragm closing said chamber to capture a supply of irrigation chemical therewithin, and means penetrating said diaphragm to communicate said supply of chemical material to said flow path in response to said flow of water in the latter, wherein said first valve member includes an inverted cup-like portion defining said sub-cavity therewithin, said housing including an upwardly extending inflow extension conveying said flow path from said inlet to said first valve member and opening in an end edge, said cup-like portion resting upon said end edge in said first position thereof, said housing also defining an annular sealing surface circumscribing said cup-like portion and through which said flow path downstream of said first valve member communicates with said vent passage, said cup-like portion defining an annular radially extending lip at a lower marginal edge thereof which is spaced from said sealing surface in said first position of said first valve member, said first valve member moving vertically upwardly to engage said lip with said sealing surface in said second position of said first valve member.

12. The invention of claim 11 wherein said cup-like portion of said first valve member includes and end wall, said end wall defining a passage therethrough, and said second valve member being disposed in said passage of said end wall to open and close the latter in said respective first and second positions of said second valve member.

13. The invention of claim 12 wherein said second valve member includes a disk portion and a stem portion movably carried by said first valve member, in said first position of said second valve member said disk portion is spaced from said end wall of said cup-like portion to open said passage therethrough, in said second position of said second valve member said disk portion sealingly engaging said end wall to block said through passage, said disk portion being disposed in confronting relation with said flow path of said inflow extension to move in response to said flow of water impinging thereon from said first position thereof to said second position.

14. The invention of claim 13 wherein said second valve member moves vertically between its first and its second positions, said disk and stem portions of said second valve member being of comparatively weighty material to move of its own weight to the first position of said second valve member.

15. The invention of claim 14 wherein said second valve member communicates between said vent passage and said flow path upstream of said first valve member at a height above communication of said vent passage with said flow path downstream of said first valve member.

16. The invention of claim 11 further including means for preventing relative rotation between said cup-like portion and said housing to ensure alignment of said second valve member with said inflow extension.

17. The invention of claim 11 further including said means for penetrating said diaphragm to communicate said supply of chemical material to said water flow path including a metering flow path extending from said water flow path to said cartridge chamber, and a return flow path communicating from said cartridge chamber to said water flow path, each of said metering flow path and said return flow path communicating with said water flow path vertically above said outlet.

18. A vacuum breaker valve comprising: a housing defining an inlet, an outlet, and a flow path extending between said inlet and said outlet for communicating a flow of water therebetween, said housing further defining a vent passage opening outwardly from said flow path to ambient, a first valve member disposed in said flow path and movable between a first position opening said vent passage to said flow path downstream of said first valve member, in a second position said first valve member closing said vent passage and communicating said inlet with said outlet, said first valve member moving from said first to said second position in response to said flow of water in said flow path, a second valve member moving in unison with said first valve member between a respective first position communicating said vent passage with said flow path upstream of said first valve member and a respective second position closing said communication, wherein said housing defines an annular chamber and an upwardly extending inflow extension conveying said flow path from said inlet to said chamber to open thereat in an end edge, said first valve member including an inverted cup-like portion reciprocably received for vertical motion within said annular chamber and disposed over said inflow extension to rest upon said end edge in said first position of said first valve member, said cup-like portion defining a radially extending lip at a lower marginal edge thereof, said housing defining an annular sealing surface in juxtaposition with said lip of said cup-like portion and in said first position of said first valve member being spaced therefrom to permit communication therethrough from said flow path to said vent passage, in said second position of said first valve member said annular lip sealingly engaging said sealing surface, said cup-like portion including an end wall defining a passage therethrough aligning with said flow path within said inflow extension, said second valve member being disposed at said through passage of said end wall.

19. The invention of claim 18 wherein said vacuum breaker valve also includes said first and second valve members being gravity responsive to move to the first position thereof in the absence of an inflow of water to said annular chamber via said inflow passage from said inlet.

* * * * *